(12) United States Patent
Kailash

(10) Patent No.: US 6,408,329 B1
(45) Date of Patent: Jun. 18, 2002

(54) REMOTE LOGIN

(75) Inventor: GIN Kailash, San Jose, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 08/694,952

(22) Filed: Aug. 8, 1996

(51) Int. Cl.[7] .......................................... G06F 15/167
(52) U.S. Cl. ..................... 709/212; 709/301; 709/227; 709/321
(58) Field of Search ..................... 395/200.03, 712, 395/2, 700; 364/400.01; 709/217, 227, 321, 301, 212

(56) References Cited

U.S. PATENT DOCUMENTS

| | | | | |
|---|---|---|---|---|
| 5,265,239 A | * | 11/1993 | Ardolino | 709/217 |
| 5,384,890 A | * | 1/1995 | Anderson et al. | 395/2 |
| 5,452,460 A | * | 9/1995 | Distelberg et al. | 709/321 |
| 5,519,833 A | * | 5/1996 | Agranat et al. | 395/200.03 |
| 5,634,058 A | * | 5/1997 | Allen et al. | 395/712 |
| 5,768,126 A | * | 6/1998 | Frederick | 364/400.01 |
| 5,815,707 A | * | 9/1998 | Krause et al. | 709/321 |
| 6,047,323 A | * | 4/2000 | Krause et al. | 709/227 |
| 6,098,112 A | * | 8/2000 | Ishijima et al. | 709/301 |

OTHER PUBLICATIONS

RFC1282. B.Kantor, Dec. 1991.*
TCP/IP Illustrated: the protocols vol. 111. W.Richard Stevens, 1994.*
Digital Unix Network Programmer's Guide [www.unix.digital.com/publication] Mar. 1996.*

* cited by examiner

Primary Examiner—Mark H. Rinehart
Assistant Examiner—Thong Vu
(74) Attorney, Agent, or Firm—Nathan Cass; Mark T. Starr

(57) ABSTRACT

A login process is provided in which input to a client computer effects operations by a server computer, comprising the steps of: providing a stream-head in client kernel memory space between a shell program in client user memory space and a terminal-connection module in client kernel memory space; creating a target module in client kernel memory space which includes a network-connection to the server computer, and inserting a source module beneath the stream-head in client kernel memory space which passes information between the terminal-connection module and the target module.

4 Claims, 5 Drawing Sheets

KURLOGIN STRUCTURES ON THE CLIENT SYSTEM

RLOGIN STRUCTURES ON THE CLIENT SYSTEM

RLOGIN STRUCTURES ON THE SERVER SYSTEM

REMOTE LOGIN

BACKGROUND OF INVENTION

1. Field of the Invention

The invention relates in general to communications over computer networks, and more particularly, to remote login from one computer to another.

2. Description of the Related Art

The standard model for network applications is the client-server model. A server process is a process that waits to be contacted by a client process for which the server process performs some function. A typical scenario, for example, might involve a server process starting on some computer system in a network. The server process initiallzes itself, then goes to sleep waiting for a client process to contact it requesting some service. A client process is started on another computer connected to the server computer by the network. The client process sends a request across the network to the server requesting some form of service. The server responds by performing the requested service such as: print a file for the client, read or write a file on the server system and deliver it to the client, execute a command for the client on the server system, or allow the client to login to the server system.

The last mentioned function, allowing a user of a client system to login to the server system, can permit a user to enter instructions to the client and have those instructions executed by a server system. In this manner, it is possible for the user to access information stored in by server system or to utilize the processing power of the server system, for example. A login process ordinarily involves setting up a network connection between a client system and a server system. Establishing a network connection such that a client can issue instructions to a server system typically involves the creation of processes in both the client system and the server system to support the transfer of information, either instructions or data, between the two systems in such a fashion that instructions issued by a user, through the client system control the server system, and so that data provided by the server system is displayed by the client system.

In a UNIX operating system environment, one of the most common approaches to login to a remote system is through the well known "rlogin" (remote login) process. A description of the popular rlogin process is provided in *Unix Network Programming*, W. Richard Stevens,. Prentice Hall, Inc., 1990, chapter 15, Remote Login, pages 589–667. An exemplary implementation of rlogin will be explained with reference to FIGS. 1A, 1B and 1C. FIG. 1A illustrates the structure and interaction among client side process modules prior to the execution of the rlogin process. FIG. 1B illustrates the structure and interaction among client side process modules following the execution of the rlogin process. FIG. 1C illustrates the structure and interaction among server side process modules following the execution of the rlogin process.

Referring to FIG. 1A, before rlogin is invoked, a user communicates directly with the client system through a shell program 20 created in user memory space. The shell program is a command interpreter that users typically execute after logging into the client system. In essence, the shell program receives user input and acts on it. The shell program, for example, may respond to user input by issuing calls to appropriate operating system services that exist in the system kernel memory space. For a general discussion of the UNIX operating system, refer to *The Design of the UNIX Operating System*, Maurice J. Bach, Prentice -Hall, Inc., 1986. The shell program is discussed at pages 6–15 of that book.

In the UNIX operating system environment, user memory space and kernel memory space ordinarily are separated. Generally, although user memory space ordinarily is occupied by user processes and files, it may be preempted by the kernel. Kernel memory space usually can be occupied only by the operating system kernel unless the kernel gives up the space. As a result, special operating system communications mechanisms have been developed to transfer information (data or instructions) across the user-kernel memory space boundaries. One such mechanism involves "streams". In FIG. 1A, a stream-head transfers information between a tty-connection module 24, in kernel space, and the shell program 20, in user space.

A tty-connection allows a process to communicate with an external device such as disks, tape drives, terminals and networks. The kernel modules that control devices are known as device drivers. Terminal drivers have the same function as other drivers: to control the transmission of data to and from terminals. Terminals are the user's interface to the system. Examples of terminal devices include, keyboard, mouse and display screen. To accommodate interactive use of the UNX system, terminal drivers typically contain an internal interface to line discipline modules, which interpret input and output. For example, in canonical mode, the line discipline converts raw data sequences typed at the keyboard to a canonical form before sending the information to the receiving process. The line discipline also converts raw output data produced by processes into a form the user expects. In raw mode, the line discipline passes data between processes and the terminal without such conversions.

In operation, tty-drivers 26, responsive to user input strokes on a keyboard, for example, communicate with the tty-connection module 24, which in turn, communicates through the stream-head 22 with the shell program 20. The terminal-connection, for example, can be a stack comprising multiple modules that have been individually pushed onto the stream beneath the stream-head 22. The shell 20 interprets the user keyboard input and issues appropriate system calls.

A description of streams in a UNIX operating system environment is provided in, *Unix Network Programming*, Sections 7.7–7.9, Pages 374–386. A stream is a full-duplex connection between a user process and a device driver or a pseudo-device driver. A typical stream connection includes a set of linearly linked queue pairs, one member of each pair for input and the other for output. The top portion of a stream in the kernel space is referred to as a stream-head and serves as a system call interface. A feature of streams is that a process can add modules between the stream-head and a device driver or pseudo-device driver. Each new processing module is pushed onto the stream just below the stream-head in a LIFO stack. An example of a stream process module is one that implements terminal line discipline. Another example of the use of stream modules is to implement a communication protocol. For example, a device driver may serve as a network interface (Ethernet device driver, token ring device driver, etc.), and a series of linked stream modules may provide a layered network protocol (TCP/IP, XNS, etc.) When a process writes data to a stream, the kernel sends the data down the stream's output queue. When a device driver receives input data, it sends the data up the stream's input queue to a reading process. The stream modules operate on the data as the data is passed up and down the stream queues.

Referring to FIG. 1B, when rlogin is invoked, it instantiates a set of software modules that interact to cause the client system to implement a remote login to a server system. More particularly, a client side network-connection 28 is created, in kernel space on the client system, to the server system. The client side network-connection 28 (within dashed lines) communicates with TCP-lower-q 31 ("transport control protocol") and is linked to a new stream-head 32. The network-connection 28, for example, may include a TCP-upper-q module 27 and a sockmod 29 ("socket connection"). The TCP-upper-q 27 transfers information to and from TCP-lower-q 31 over the network that connects the client and server systems. The current tty-connection state is saved, and the tty-connection is set to the raw mode. An rlogin-r client process 34 is created in user space to read data from the network-connection 28 and write it to the tty-connection 24. An rlogin-w client process 36 is created in kernel space to read data from the tty-connection 24 and write it to the network-connection 28. Stream-head 22 transfers information between the tty-connection 24 in kernel space and the rlogin-r 34 and rlogin-w 36 processes in user space. Stream-head 32 transfers information between the network-connection 28 in kernel space and rlogin-r 34 and rlogin-w 36 in user space.

It should be appreciated that there is an enormous variety of tty types and network types. For example, the tty-connection may include one or more of the following modules: ttcompat (terminal compatibility), ldterm (line discipline), ptem (pseudo-terminal), etc. The tty-drivers, for example, may include serial driver, network connection, network-drivers, etc. The network-connection, for instance, may include socket, TCP, etc. Finally, the network-drivers may consist of IP-driver, Ethernet driver, token-ring driver, FDDI driver, ATIM Fast Ethernet, etc.

The illustrative drawing of FIG. 1C shows an example of possible server system software-based structures and module interactions that result when the client invokes rlogin. First, second and third server side stream-heads 40, 42 and 44 are created in the server system kernel memory space. The in.rlogind process 38 is created in the server system user memory space. in.rlogind is a single process which operates to multiplex signals transferred between the first and second server stream-heads 40 and 42. The first server stream-head 40 transfers information between in.rlogind and sockmod 46 and TCP-upper-q 48 which are created in server kernel memory space and which are linked in a stack below the first stream-head 40. Note that TCP-upper-q module 48 communicates with the TCP-lower-q 31 as shown. The second server stream-head 42 transfers information between in.r-logind 38 and pckt (packet driver module) 52 and ptm (pseudo-terminal-master module) 54 which are created in server kernel memory space and which are linked in a stack below the second stream-head 42. The third server stream-head 44 transfers information between the shell-server 64 and ttcompat (maintains compatibility with earlier software versions) 56, ldterm (line discipline) 58, ptem (pseudo-terminal emulation module) 60 and pts (pseudo-terminal-slave) 62, which are created in server kernel memory space and which are linked in a stack below the third stream-head 44. Note the linkage between ptm 54, which is a pseudo-terminal driver for rlogind, and pts 62, which is a pseudo-terminal driver for shell-server 64. The server login 66 accepts and verifies the user password, for example.

Referring to FIGS. 1B and 1C, note that the client system employs two processes, rlogin-r 34 and riogin-w 36 to transfer information in two directions rather than using a single multiplexing process like in.rlogind 38 which is created on the server system. One reason for the creation of two client system processes is that it often is desirable to have the ability to stop the rlogin-w process 36 without stopping the rlogin-r 34 process so that the user can halt data transfer from client to server in order to enter commands on the local client system, while still allowing any output from the remote server system to appear on the user's local client terminal.

The following is a brief description of the client side steps typically involved in transferring a single character from the client system to the user system using the structures illustrated in FIGS. 1B and 1C. The rlogin-w process 36 reads the character from the tty-connection 24 via stream-head 22 and writes it to the network-connection 28 via stream-head 32. The character is transferred to the remote server via a computer network. The server receives the character, and echoes it back to the client system over the computer network. system. The rlogin-r process 34 reads the echoed character from the network-connection 28 via stream-head 32 and writes it to the tty-connection 24 via stream-head 22.

Client system access to a remote server system using the communication structures and processes described above ordinarily requires two client processes per connection (rlogin-r and rlogin-w).

It also requires two client side context switches per character (one per client stream-head). It further requires four client side data copy operations per character (two per stream-head). Unfortunately, the use of two processes requires more memory, and the multiple context switches and data copy operations consume more processor time. The preceding example involved the transfer of only a single character. The client system resource utilization problems can compound when large number of characters are to be transferred.

It will be appreciated that the problems described above with reference to the exemplary rlogin process also exist in other processes such as telnet and rsh, for example. Thus, there has existed a need for an improved mechanism for remote login communications between a client system and a server system. The present invention meets this need.

SUMMARY OF THE INVENTION

The present invention provides a novel process and computer program based control of a client computer system which effect a remote login session with a server computer system through control mechanisms resident entirely in client kernel memory space. The invention advantageously reduces the number of processes, context switches and data copies required during a remote login session. As a result, less memory and fewer processing resources are required for remote login. These and other features and advantages of the invention will be better appreciated from the following detailed description and the accompanying drawings.

DETAILED DESCRIPTION OF THE PREFERRED EMBODIMENT

The present invention comprises a novel kernel oriented user remote login process and an associated computer program based mechanism for control of a client computer system. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 2:
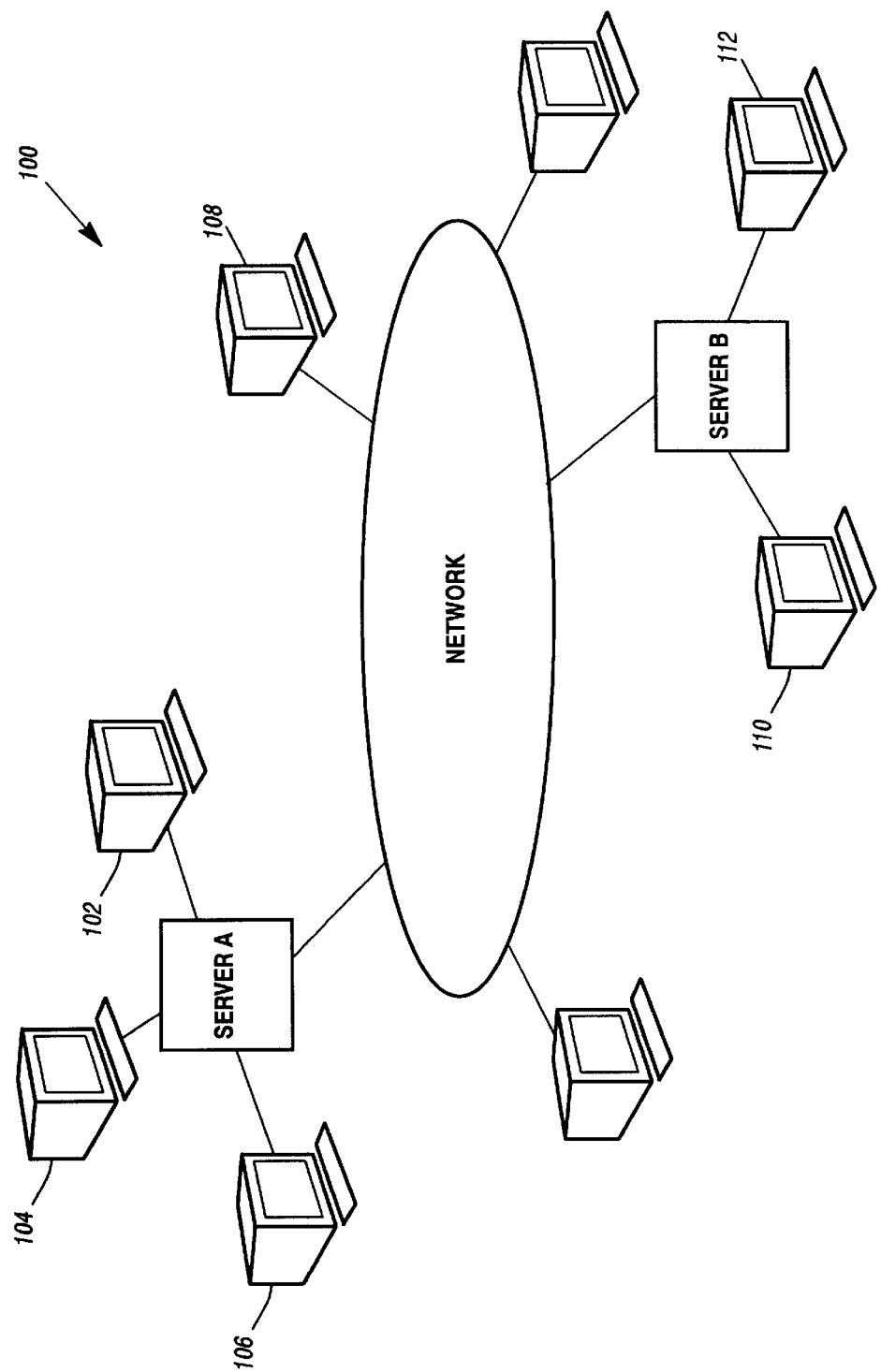
FIG. 2 is an illustrative pictorial view of a computer network that can be used in connection with the present invention.

FIG. 2 is an illustrative pictorial diagram of a computer network 100 such as the Internet, for example. The computer network 100 includes small computers, such as computers 102, 104, 106, 108, 110 and 112 and large computers, such as computers A and B, commonly used as servers. In general, small computers may be "personal computers" or workstations and are sites where a human user operates the computer to make requests for data or services from other computers on the network. Often, the requested data resides in the large computers referred to as servers. In this scenario, the small computers are client systems and the large computers are servers. In this specification, the term "client" refers to a computer's general role as a requester of data or services, and the term "serve" refers to a computer's role as a provider of data or services. In general, the size of a computer, in terms of its storage capacity and processing capability, does not necessarily affect its ability to act as a client or server. Further, it is possible that a computer may request data or services in one transaction and provide data or services in another transaction, thus changing its role from client to server or vice versa.

Figure 3:
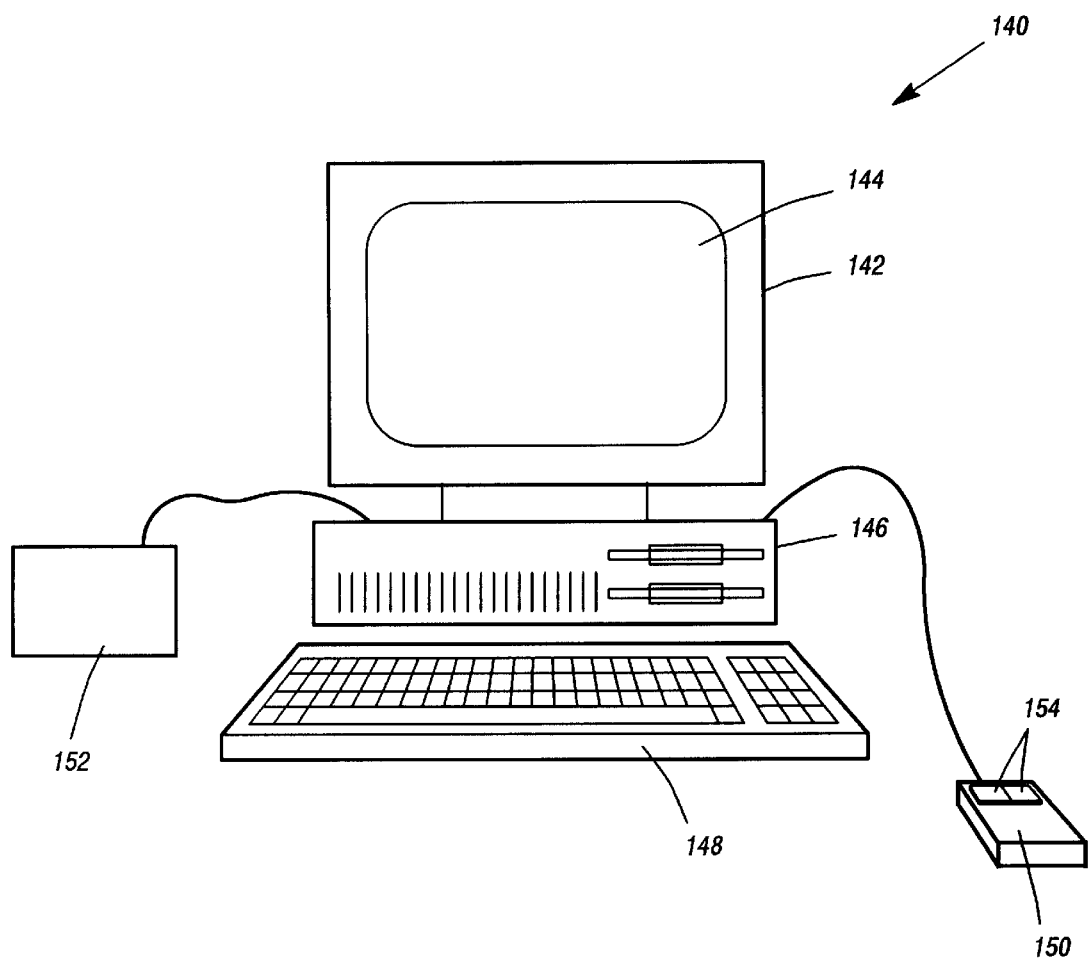
FIG. 3 shows an exemplary client computer system that can be used to establish a novel kurlogin session in accordance with the present invention.

The illustrative drawing of FIG. 3 shows an exemplary client computer system 140. It includes a display device 142 (such as a monitor), a display screen 144, a cabinet 146 (which encloses typical computer components such as a CPU, RAM, ROM video card, hard drive, network adapter card, serial ports, etc.), a keyboard 148, a mouse 150, and perhaps a modem 152. The modem, for example, allows the client computer system to be connected to an Internet network via phone lines, for example.

Figure 4:
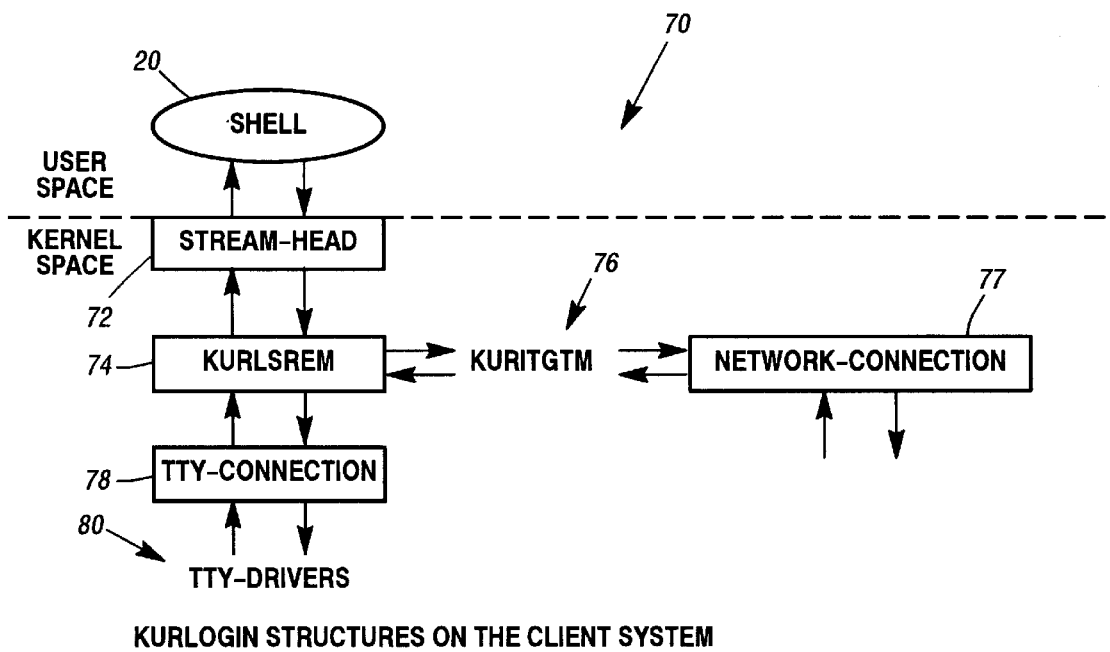
FIG. 4 is an illustrative computer process structure diagram which shows the structure and interaction among client-side process modules in accordance with the kurlogin mechanism of a presently preferred embodiment of the invention.

The illustrative drawing of FIG. 4 shows a presently preferred embodiment of an improved computer program based mechanism 70 for control of a client computer system for login to a server computer from a client computer in accordance with the invention. The mechanism 70 shall be referred to herein as kernel oriented remote user login ("kurlogin"). The novel mechanism 70 is implemented as a combination of computer software modules created in a storage medium, such as RAM or disk, of a client computer. The modules are structured to interact with each other within kernel memory space of the client system in order to achieve remote login to a server computer. More specifically, the mechanism 70 operates in kernel space to direct information between a client system input device, such as a keyboard or mouse, and the client side of a network connection to a server system. In a present embodiment, the mechanism includes a stream-head 72 and a novel kernel oriented remote login source module ("kurlsrcm") 74. kurlscrm is linked in a stream beneath the stream-head 72. kurlsrcm transfers information to and from a module in kernel space, which shall be referred to herein as the kernel oriented user login target module ("kurltgtm") 76, which communicates with a client side network-connection 77 to the remote login server. A tty-connection 78 is linked in the stream below kurlscrm. The tty-connection 78 transfers data to and from the tty-drivers 80 in response to user input to an external input device, for example.

kurltgtm, for example, interprets packets transmitted by kurlsrcm, perform routine network management functions and handles multiplexing of packets transferred through kurlsrcm. For example, when kurlscrm sends a character to kurltgtm, kurltgtm tries to send it to the remote login server. If no acknowledgment is received from the server, then kurltgtm resends the character. kurltgtm also manages network flow control functions. Moreover, it may perform data multiplexing/demultiplexing among network connections using well known techniques.

When a user on a client system invokes kurlogin, it effects a remote login session by completing the following tasks in the following order:

1. get current terminfo setting from ldterm;
2. set ldterm to raw mode;
3. push kurlscrm over stdout;
4. raise the connection priority;
5. save terminfo in the kurlscrm area;
6. connect to the remote server;
7. send local username, remote username and TERM environment variables;
8. exit.

Thus, kurlogin causes kurlsrcm 74 to be pushed between the stream-head 72 and the tty-connection 78. It also causes the current tty-connection state to be saved in kurlsrcm, and sets the tty-connection to raw mode. A remote connection to the server system is established. The server side network connection, for example, may involve process modules and an overall structure just like the earlier server side login session connection illustrated in FIG. 1C.

Figure 1A:
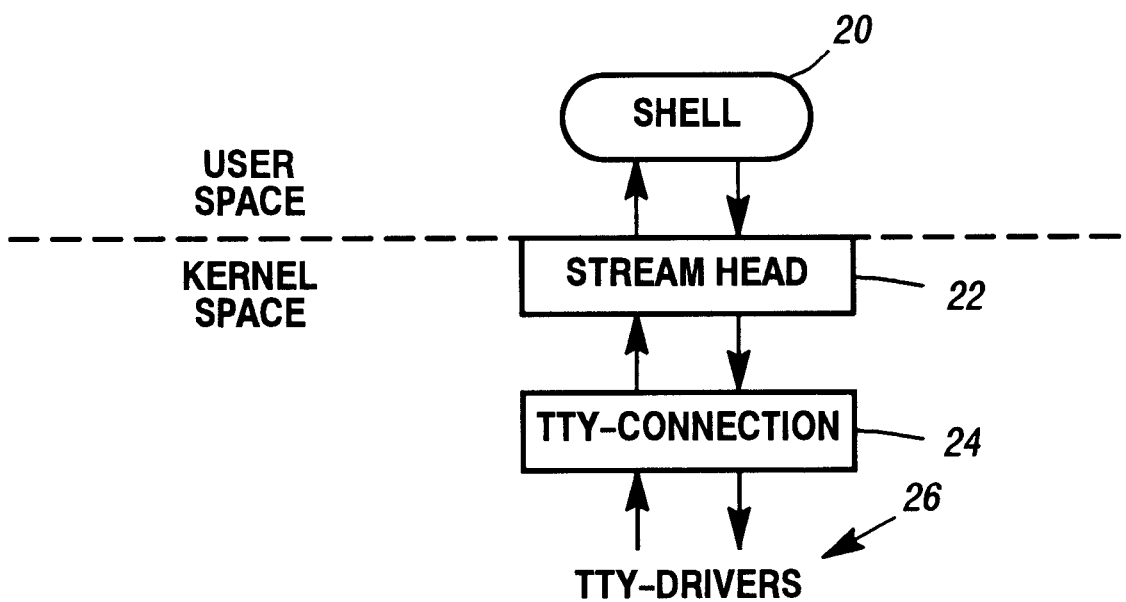
FIG. 1A is an illustrative computer process structure diagram which illustrates the structure and interaction among client side process modules prior to initiation of a remote login session.
Figure 1B:
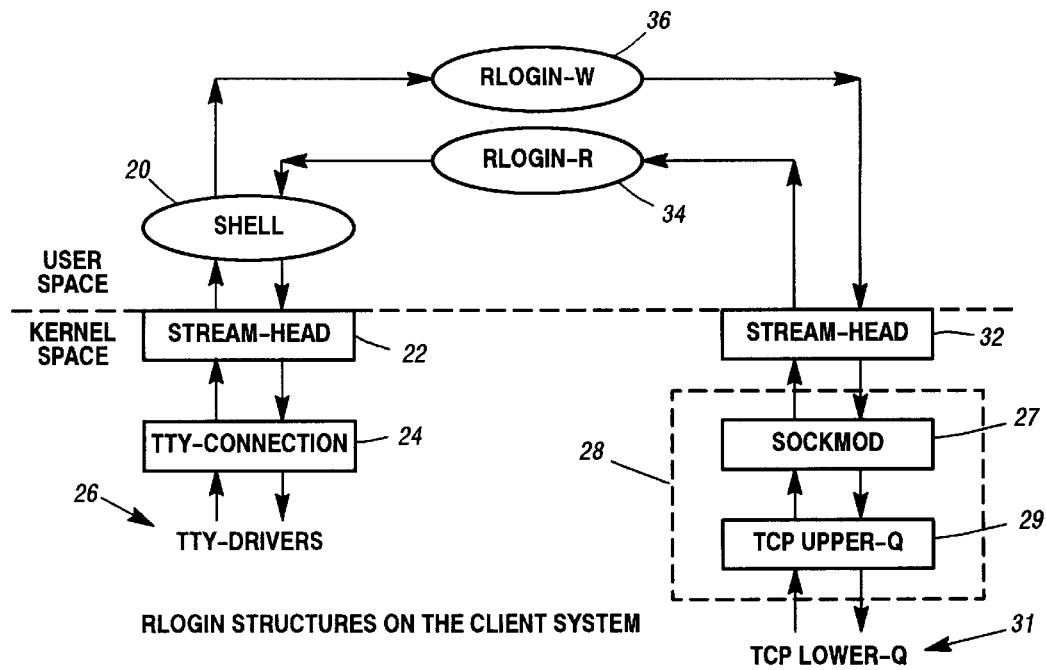
FIG. 1B is an illustrative computer process structure diagram which illustrates the structure and interaction among client side process modules during an rlogin session.
Figure 1C:
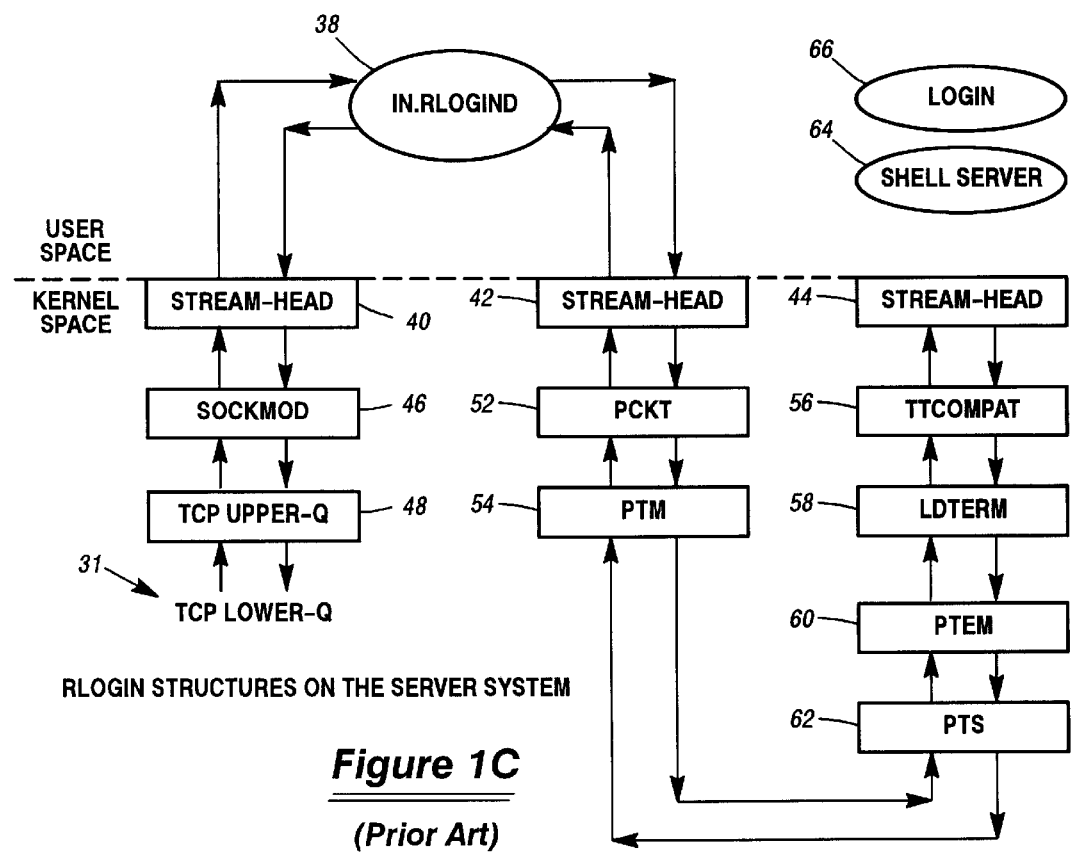
FIG. 1C is an illustrative computer process structure diagram which illustrates the structure and interaction among server side process modules during an rlogin or during a kurlogin session.
Figure 5:
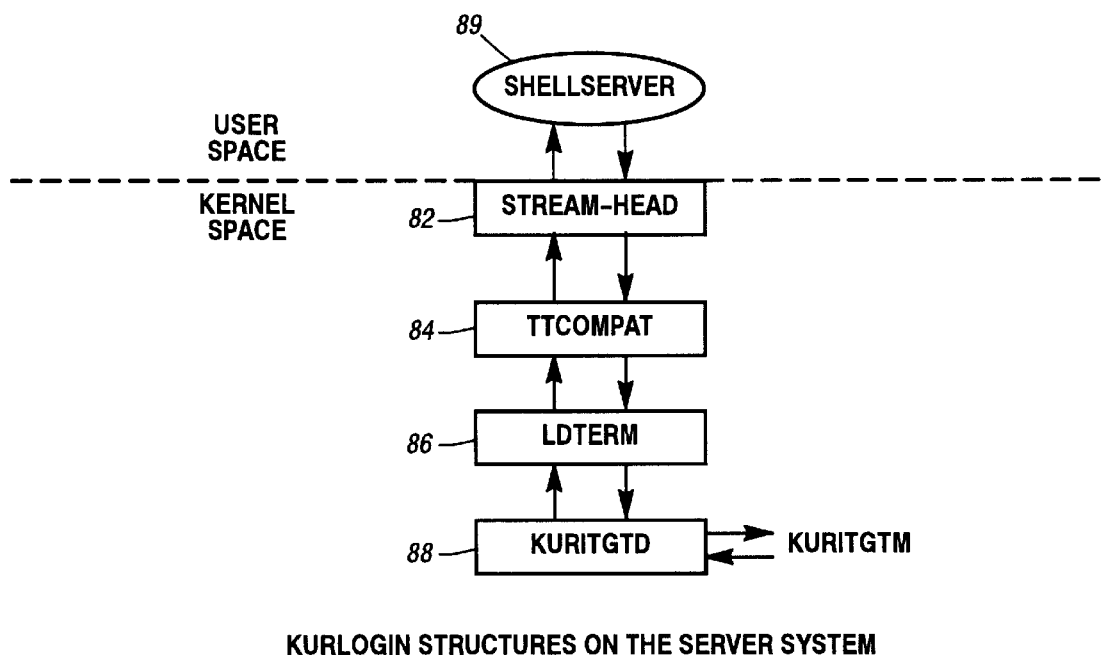
FIG. 5 is an illustrative computer process structure diagram which shows the structure and interaction among server side process modules of a stream during a kurlogin session.

As an alterative to the prior server side login connection of the general type described with reference to FIG. 1C, a server connection may include a stream of the type disclosed in FIG. 5. A stream-head 82, a ttcompat module 84, an ldterm module 86 and a kernel user oriented remote login target driver ("kurltgtd") 88 are created in kernel memory space as shown. kurltgtd is a driver in server memory space responsive to packets created by kurlsrcm. These packets are transferred over the network using kurltgtm. When kurltgtd receives the packets, it passes them up the server side stream to the shell-server 89. The I_PUSH command is used to insert kurlsrcm 74 between the stream-head 72 and the tty-connection 78. This command pushes a module whose name is pointed to onto the top of the current stream just below the stream-head. It then calls the open routine of the newly pushed module. Streams is a UNIX operating system facility that permits transfer of information from one module to the next for modules connected between a stream-head and a driver. When modules are not connected between a stream-head and a driver then, transfers between such modules using streams facilities ordinarily is not feasible. This is one reason that the kurlscrm employs a special packet format for transfers to and from kurltgtm.

When the connection closes, a daemon process receives the close message issued by a protocol handler. The daemon process starts a close process which restores the tty-connection state and pops the kurlscrm from the stream connection and exits. Following the close of the kurlogin session, the client system returns the status illustrated in FIG. 1A. More specifically, a client's kurlogin connection is closed when a corresponding server kurogin connection is closed. A kernel oriented remote unlogin daemon ("kurlunlogind") is invoked to close the kurl client side connection. It obtains the connection-device-number from a kurl-disconnect-packet. The kurl-disconnect-packet is created by a kurl protocol handler when the server connection is closed. Kurlunlogind obtains the ttyname from the kurlscrm area using the connection device number provided in the kurl-disconnect-packet. Kurlunlogind opens the ttyname device. It obtains the saved termino information from the kurlscrm area. It gets the number of stream modules popped off by kurlogin or tpcalogin. It pops off kurlscrm. The I_POP command is used to remove kurlscrn from the stream. This command removes the module just below the stream-head of the stream pointed to by fildes If ptem was popped off, then it pushes ptem back onto the stream. If ldterm was popped off, then it pushes ldterm back onto the stream. If ttcompat was popped off, then it pushes ttcompat back onto the stream. It restores the terminfo to ldterm. It displays a message on the ttyname device indicating that the kurl connection is closed. It exits.

As mentioned above, streams are a general, flexible facility and a set of tools for the UNIX system communication services. It supports the implementation of services ranging from complete networking protocol suites to individual device drivers. A description of the streams mechanism is provided in the *UNIX System V Release 3, STREAMS Programmer's Guide*, produced by AT&T, 1986. In general, a stream is a full-duplex processing and data transfer path between a streams driver in kernel space and a process in user space. In the kernel, a stream is created by linking a stream-head, a driver and zero or more process modules between the stream-head and the driver. In this disclosure, "streams" refers to the mechanisms; and "stream" refers to the path between user and driver. A streams driver may be a device driver that provides the services of an external I/O device or a software driver commonly known as a pseudo-device driver, that performs functions internal to the stream. Data are packaged in streams messages for passage between the driver and the stream-head. The stream-head passes data between the data space of a user process and the streams kernel space. One or more kernel-resident modules may be inserted into a stream between the stream-head and driver to perform intermediate processing of data as it passes between the stream and the driver. The novel kurlscrm of the present invention is a kernel-resident module that is intended to be inserted into a stream.

During a kurlogin session the following operations are performed, for example, when a single character is typed by a user on a login client system. The tty-drivers 80 provide the key stroke(s) information to the tty-connection module 78. The tty-connection module 78 presents the character to the kurlsrcm 74 which sends the character to kurltgtm 76 for transfer to the login server. The character is echoed back to kurltgtm by the login server. The echoed character is transferred by kurltgtm 76 to the kurlsrcm 74 which sends it to the tty-connection module 78 which presents it to the tty-drivers 80. The tty-drivers 80 cause a character to appear on the login client screen for example.

A basic function of the kurlsrcm is to direct information from a login client tty-connection (or a pseudo-tty-connection) to a login client-side network-connection and to direct data from the network-connection to the client tty-driver (or pseudo-tty-connection). Note that a tty-connection may include multiple modules such as ldterm and ttcompat, for example. kurlscrm fills this role while operating in kernel space using the kernel facilities available to support stream mechanisms. kurlscrm, therefore, advantageously operates without the assistance of processes in user space to direct data between the client side tty-connection (or pseudo-tty-connection) and a client side network-connection.

Thus, a remote login from a client system to a server system using kurlogin in accordance with the invention advantageously obviates the need for user space processes such as rlogin-r and rlogin-w. Moreover, process context switches and data copying attendant to crossing of the kernel space-user space boundaries are avoided since no such crossings are required. As a consequence, less overhead in terms of memory allocation processor time is required for remote logins in accordance with the invention. The more information that is transferred between client and server, the greater will be the advantage of using the kurlogin process.

The following is a comparison of the performance of prior login processes such as, telenet, rsh or rlogin and the novel kurlogin process of the present invention. Prior processes ordinarily required two processes per connection. It required two reads and two writes for a single typed character, for example.

A read operation typically has the minimum overhead of the following type:
one system call operation
one file handle operation
one stream head operation
one data copy from kernel space to user space
one memory deallocation to free the kernal data space A write operation typically has the minimum overhead of the following type:
one system call operation
one file handle operation
one stream head operation
one memory allocation to accommodate the data in kernel space
one data copy from user space to kernel space The minimum resource overhead per connection has been summarized in the following table.

TABLE 1

| item | PRIOR | KURLSRCM |
|---|---|---|
| Processes | 2 | 0 |
| File handle | 1 | 0 |
| stream head | 1 | 0 |

The minimum operation overhead ordinarily required per typed character has been summarized in the following table.

TABLE 2

| operations | PRIOR | KURLSRCM |
|---|---|---|
| system call | 4 | 0 |
| data copy | 4 | 0 |
| file handle | 4 | 0 |
| stream head | 4 | 0 |
| memory allocation | 2 | 0 |
| memory deallocation | 2 | 0 |
| process context switch | 2 | 0 |

The following provides performance results for kurl versus prior remote login processes. The benchmark was done using the same network protocol (kurl). The data transfer was within the system, i.e. the same system was working as a client system as well as a server system.

The test connections were created by recursive rlogin (kurlogin for kurlsrcm) i.e.
rlogin kailash -1 kailash
rlogin kailash -1 kailash
.
.
.
rlogin kailash -1 kailash The test was done for 100 connections. The server side connection end was as defined in FIG. 5 for both rlogin and kurlogin. It had created 100 server processes (one process per connection). It had created 200 client processes for rlogin (two process per connection) and no client process for kurlogin. The data flow was from last connection to last-1 connection to . . . to second connection to first connection to display. The display was in the system memory.

The test program wrote the specified data packet continuously. The test system did not have any free CPU time when the test was running.

The test system configuration was:
One 50 MHz 80486 CPU with 1 MB cache memory
128 MB main memory
SVR4-MP UNIX Operating System The performance results are summarized in the following table.

TABLE 3

| concept | test packet size in Bytes | test data size in Kilo Bytes | packets processed per connection | time taken to finish the test in seconds | performance improvement |
|---|---|---|---|---|---|
| PRIOR | 1 | 20 | 18067 | 1828 | |
| KURLSRCM | 1 | 20 | 20480 | 237 | 671% |
| PRIOR | 77 | 1024 | 13618 | 1499 | |
| KURLSRCM | 77 | 1024 | 13618 | 160 | 837% |
| PRIOR | 4096 | 16384 | 4096 | 1211 | |
| KURLSRCM | 4096 | 16384 | 4096 | 55 | 2102% |

The performance improvement formula is (time taken by PRIOR REMOTE LOGIN PROCESS—time taken by KURLSRCM)/(time taken by KURLSRCM). When the packet size is 1 byte then the maximum performance improvement came from the saving of processes context switching. When the packet size is 4096 bytes then the maximum performance improvement came from the saving of data copy. When the packet size is 77 bytes then the maximum performance improvement came from the saving of the processes context switching and data copy.

When the packet size is 1 byte, then the maximum performance improvement came from the saving of processes context switching.

When the packet size is 4096 bytes, then the maximum performance improvement came from the saving of data copy.

When the packet size is 77 bytes, then the maximum performance improvement came from the saving of the processes context switching and data copy.

The attached Appendix A, which is hereby incorporated herein by this reference, is a source code listing of a presently preferred embodiment of a computer program module for implementing the kurlsrcm functionality in a client computer system. The overall functionality of kurlsrcm falls into two categories: data arrival from the tty-driver (e.g., the user side) and data arrival from a kernel oriented user login target module ("kurlgtm") (e.g., the network side). In a current implementation, data arrival form the tty-driver is handled by a tty-arrived-data module, and data arrival from kurltgtm is handled by a network-arrived-data module. In the code listing set forth in Appendix A, the tty-arrived-data module is identified as "kurlsrcmrput" set forth at lines 1–177, and the network-arrived-data module is identified as "kurlsrcmwsrv" and is set forth at lines 178–236. In terms of interoperation with the client computer system, the kurlsrcm module is instantiated in a memory medium of the client, typically RAM or disk, so that it can control the client computer in effecting a remote login to a server computer system as described below. The following description of the operations controlled by kurlsrcm references line numbers in Appendix A that correspond to the various program instructions, structures and specifications.

The program material in Appendix A at lines 29–60 provides the packet header information used by a presently preferred embodiment of kurlsrcm. The structure of the kurl packet header is set forth in lines 29–46. The structure of the kurl multiplex packet header is provided in lines 48–60. In effect, kurlscrm employs its own network protocol, referred to herein as the kurl protocol. The kurl packet header and the kurl multiplex packet header are compliant with the kurl protocol.

In the kurl packet header listening, the code at about line 35, kurl_destdev designates where to send the packet. This field might designate kurlsrcm or kurltgtm, for example. At about line 36, kurl_ordev designates the origination device. This field mnight designate kurltgtm or kurlsrcm, for example. At about lines, 37 and 38, kurl_destip and kurl_orgip designate the client ip (internet protocol) number and the server ip number, respectively.

In the kurl mux packet header listing, kurl_packettype at about line 50 designates what is in the multiplex packet. For example, it may comprise partial data or a request for a new connection. kurl_servpackno designates the protocol. For example, it might be rlogin, telenet or rsh. Thus, the kurl protocol can handle other protocols in addition to the kurl protocol.

When data arrives from the tty, a determination is made as to whether or not a connection has been established. If not, then the arrived data is saved, perhaps to be sent upstream later. When data arrives before a connection has been established, then an error condition may very well exist. If a kernel oriented user remote login remote terminal emulation ("kurlrte") is enabled, then the data is sent to kurlrte. The emulation, for example, can be employed to capture input to the system. Kurlrte forms no part of the present invention and need not be described further herein. Upon arrival of the data, a determination is made as to whether it includes escape sequence information. If so, then the escape sequence is handled; for example, the user may enter instructions signaling a desire to break the connection.

Upon arrival of the data, a determination is made as to whether the echo mode has been set. If so, then the data is echoed back to the sender. Finally, the arrived data is sent to kurltgtm which sends it over the network to the destination server system. See lines 6–15 of Appendix A.

The code that pertains when data arrives from the tty-connection (or pseudo-tty-connection) is set forth in lines 80–177. The code at about lines 91–95 checks tty-connection timing information including hardware clock performance. It also checks to determine whether a connection has been established yet. If not, then the arrived data is placed on a queue to wait to be sent upstream later. The code at about lines 97–98 complies with remote terminal emulation in accordance with kurlrte. The code at about lines 99–144 checks for an escape sequence in the arrived data. If an escape sequence is detected, then the connection will be suspended. The code at about lines 145–149 checks to determine whether echo mode is set. If so, then the arrived data is echoed back to the sender, and a copy is kept. In this manner, network traffic can be saved. The code at about lines 151–156 checks to be sure that there is no erroneous zero length data packet. The code at about lines 157–176 sends the arrived data to kurltgtm using well known streams facilities. For example, the code on about lines 157–163 exercises flow control: if there is data ahead of the arrived data or the connection has been suspended then the arrived data is placed on a stream queue.

When data arrives from kurlgtm, a determination is made as to whether the echo mode has been set. If so, then the data is echoed back to the sender. Upon arrival of the data, a determination also is made as to whether kurlte is enabled. If so, then a copy of the data is sent to kurlte. Finally, the arrived data is sent to the tty-driver. See lines 18–22 of Appendix A.

The code that pertains when data arrives from the network connection is set forth in lines 178–236. The code at about lines 182–188 gets arrived data off the stream queqe. The code at about lines 189–194 determines whether echo mode is set. If so, the arrived data is echoed back to the sender. The code at about lines 195–212 implements well known stream flow control techniques. For example, the code at about lines 188–218 is a "while" loop which continues processing while data is received over the network connection. The code at about lines 217–218, for example, sends the arrived data to the next (neighbor) module in the stream queue. The code at about lines 219–234 implements well known network flow control techniques. For example, it may be necessary if the network sends over data faster than the client terminal can display or otherwise use it.

While a particular embodiment of the invention has been shown and described in detail, it will be appreciated that various improvements to the invention can be made without departing from the spirit and scope of the invention. Thus, the invention is not intended to be limited except by the appended claims.

APPENDIX A

```
1    HOW KURLSRCM FUNCTIONS?
2    It has two path to work with
3             1. When data arrives from tty driver (user side).
4             2. When data arrives from kurltgtm (network side).
5
6    WHEN DATA ARRIVES FROM TTY DRIVER?
7    It does the following.
8    1. If connection is not established, save the data to send upstream or
9       try latter.
10   2. If kurlrte is enabled, send the copy to kurlrte.
11   3. Check if it has escape sequence information, handle it.
12   4. Check if echo mode is set, echo back the data to sender.
13   5. Send the data to kurltgtm which intern will send it to detination system.
14
15   For code reference, see function kurlsrcmrput.
16
17
18   WHEN DATA ARRIVES FROM KURLTGTM?
19   It does the following.
20   1. If echo mode is enabled, echo back the data to sender.
21   2. If kurlrte is enabled, send the copy to kurlrte.
22   3. Send the data to tty driver.
23
24   For code reference, see function kurlsrcmwsrv.
25
26
27
28
29   KURL PROTOCOL HEADER INFORMATION
30   /* kurl packet header information */
31   struct kurlhead {
32            __08bits kurl__packetype;        /* packet type */
33            __08bits kurl__servpackno;       /* connect:service no. PARTDATA:packet no */
34            __16bits kurl__len;              /* length of data including kurlhead */
35            __32bits kurl__destdev;          /* destination device number */
36            __32bits kurl__orgrdev;          /* orginator device number */
37            __32bits kurl__destip;           /* destination node's IP */
38            __32bits kurl__orgrip;           /* orginator node's IP */
39            __32bits kurl__dataframeno;      /* data packet frame number */
40            __32bits kurl__ackframeno;       /* acknowledge frame number */
41            __08bits lurl__packetmod;        /* packet modifier like yes checksum present */
42            __08bits kurl__checksum;         /* 1's complement sum to make sum 0xFF */
```

-continued

APPENDIX A

```
43              __08bits kurl__reserved0;              /* reserved for future and must be zero */
44              __08bits kurl__reserved1;              /* reserved for future and must be zero */
45              /* Data follows. The data can be mux packets. The data may be 0 len */
46       };
47
48       /* kurl mux packet header, should be same as first 5 fields of kurl header */
49       struct kurlmuxhead {
50              __08bits kurl__packetype;              /* packet type */
51              __08bits kurl__servpackno;             /* connect:service no. PARTDATA:packet no */
52              __16bits kurl__len;                    /* length of data including kurlmuxhead */
53              __32bits kurl__destdev;                /* destination device number */
54              __32bits kurl__orgrdev;                /* orginator device number */
55              /* Mux data follows. The data can be 0 len */
56       };
57
58       The valid connection can be identified by
59       kurl__destdev, kurl__destip;
60       kurl__orgrdev, kurl__orgrip.
61
62
63
64       KURLUNLOGIND AND KURLHEAD RELATIONSHIP
65       The kurlunlogind gets the data kurlhead type. It uses kurl__destdev
66       information to locate the closed connection information.
67
68
69       WHAT IS KURLTGTM?
70       It is a stream module which handles the kurl protocol data.
71       1. It sends the data to remote systems.
72       2. It receives the data from remote systems.
73       3. It manages reliable communication between local and remote system.
74       4. It manages flow control.
75       5. It does data multiplexing/demultiplexing among connections.
76
77
78
79
80       /* ====================KURLSRCM CODE STARTS============================ */
81       /* This function will be executed when data arrives from tty driver */
82       kurlsrcmrput{q, mbp}
83       queue__t *q;
84       mblk__tr *mbp;
85       {
86              DEFKVTTY; uint rc;
87              switch{mbp->b__datap->db__type}
88              {
89              case M__PROTO:
90              case M__DATA:
91                     if {kvtp->kvt__rxtxtimeon} kurlreadclk{&kvtp->kvt__txtime};
92                     if {kvtp->kvt__connstate 1 = KVTCS__CONNREADY}
93                     {      /* connection is not valid, drop the packet */
94                            putq{q,mbp};
95                            return;
96                     }
97                     if (kvtp->kvt__status & KURLF__RTEMODE) kurlputrtemag(kvtp,mbp,KURLRTEMSG__KEYS);
98                     kvt__lock(kvtp);
99                     if {{{mbp->b__wptr-mbg->b__rptr}==1} && lmbp->b__cont &&
100                           KURLTTYSERVICE(kvtp~>kvt__connservice)}
101                    {      /* check for break sequence ~. */
102                           rc = *mbp->b__rptr;
103                           if (kvtp->kvt__status & KURLF__FSCSEQ}
104                           {
105                                  if {kvtp->kvt__status & KURLF__ESCSEQ2}
106                                  {
107                                         if {rc != '~'}
108                                                kvtp->kvt__status &= —{KURLF__ESCSEQ(KURLF__ESCSEQ2)}
109                                  }
110                                  else
111                                  {
112                                         if (rc == '~')
113                                                kvtp->kvt__status|=KURLF__ESCSEQ2;
114                                         else if (rc == '.')
115                                                kurlbreakself{kvtp};
116       #ifdef SUSPENDNEEDED
117                                         else if {rc == 's'}
118                                         ( /* suspend the remote connection */
119                                                kvtp->kvt__status&=-KURLF__ESCSEQ;
```

APPENDIX A

```
120                                                 SRCMSETFLAGANDFREEB {| =KURLF_RCONNSUSPEND};
121                                             }
122                                             else if {rc == 'r'}
123                                                 SRCMSETFLAGANDFREEB|&=~{KURLF_ESCSEQ|KURLF_RCONNSUSPEND|:
124    #endif /* SUSPENDNEEDED */                /* restart the remote connection */
125                                             else
126                                                 mbp = kurlgetesdata(kvtp,mbp, '-'|;
127                                         }
128                                     }
129                                     else if {rc == 0x11}
130                                     {       /* CTL-Q start the data sending */
131                                             kvtp->kvt_status &= -KURLF_CS_STOPTX;
132                                             qenable |kvtp->kvt_wq);
133                                     }
134                                     else if (rc == 0x13}
135                                             kvtp->kvt_status |= KURLF_CS_STOPTX;
136                                     else if (rc == '-')
137                                             SRCMSETFLAGANDFREEB (|=KURLF_ESCSEQ);
138                                 }
139                                 else if (kvtp->kvt_status & KURLF_ESCSEQ}
140                                 {
141                                     if (!ikvtp->kvt_status & KURLF_ESCSEQ2))
142                                         mbp = kurlgetescdata|kvtp,mbp, '-'};
143                                     kvtp->kvt_status &= ~{KURLF_ESCSEC|KURLF_ESCSEQ2);
144                                 }
145                                 if ({kvtp->kvt_stats2&KURLS2_ECHOMODE)&&( !(mbp=kurlsrcmrecho(kvtp,mbp)}})
146                                 {       /* no data to send, let us quit */
147                                     kvt_unlock(kvtp};
148                                     return;
149                                 }
150                                 if {!(rc = KURLMSGSIZE(mbp}})
151                                 {/* suppress 0 length message till applications bugs are fixed*/
152                                     KURLSTATS(kurlzerolanpkts++;kvtp->kvt_zerolenpkts++;)
153                                     freemag(mbp);
154                                     kvt_unlock(kvtp);
155                                     return;
156                                 }
157                                 KURLSTATS{kvtp->kvt_txdata+=rc; kvtp->kvt_txpkt++;}
158                                 if (kvtp->kvt_status & (KURLF_DATAPENDING|KURLF_RCONNSUSPEND})
159                                 {
160                                     putq(q,mbp);
161                                     kvt_unlock(kvtp);
162                                     return;
163                                 }
164                                 if (kurlpacknetdata(kvtp,mbp,rc};
165                                 {       /* we got some problem */
166                                     kurlmakevtxactive{kvtp};
167                                     putq{q,mbp};
168                                 }
169                                 kvt_unlock(kvtp);
170                                 return;
171
172              default;
173                      putnext(q, mbp);
174                      break;
175              }
176    }
177
178    /* This function will be executed when data arrives from kurltgtm */
179    kurlsrcmwsrv (q)
180    queue_tr *q;
181    {
182            DEFXVTTY;
183            mblk_tr *mbp;
184            kvt_lock{kvtp};
185            mbp = (mblk_t *) (kvtp->kvt_status & KURLF_CS_STOPTX|;
186            kvt_unlock(kvtp);
187            if (rbp) return;
188            while (mbp = getq{q)}
189            {
190                    if {kvtp->kvt_state2 & KURLS2_HCEOMODE| mbp=kurlsrcnwecho(mbp);
191                    if {{kvtp->kvt_status & KURLF_RTEMODE) &&
192                            (mbp->b_datap->db_type == M_DATA) &&
193                            (kvtp->kvt_connstate == KVTCS_CONNREADY) &&
194                            (kvtp->kvt_rqputnextcnt++ >= KURLMAXPUTNEXT))
195                    {
196                            if {!canputnext{kvtp->kvt_rq)}
```

-continued

APPENDIX A

```
197                     {
198                             kvt_lock(kvtp);
199                             kvtp->kvt_status |= KURLF_WQNTEDERUN; /* this rarely happens */
200                             kurlmakevtxactive (kvtp); /* let timer take care of it */
201                             kvt_unlock(kvtp);
202                             putbq(q,mbp);
203                             return;
204                     }
205                     kvtp->kvt_rqputnextcnt = 0;
206             }
207             if {kvtp->kvt_wqputnextcnt ++ >= KURLMAXPUTNEXT}
208             {
209                     if {!canputnext{q} && (mbp->b_data ->db_type <= QPCTL)}
210                             return(putbq(q.mbp));
211                     kvtp->kvt_wqputnextcnt = 0;
212             }
213             if ((kvtp->kvt_status & KURLF_RTEMODE} &&
214                     {mbp->b_datap->db_type == M_DATA} &&
215                     {kvtp->kvt_connstate == XVTCS_CONNREADY}}
216                             kurlputrtemsg{kvtp,mbp,KURLRTEMSG_DISP};
217             putnext(q,mbp};
218     }
219     kvt_lock(kvtp);
220     if {kvtp->kvt_status & KURLF_STOPPX}
221     {       /* we had stopped the remote transmission now try to start it */
222             if {!kurlxnetdcpack(kvtp,KURLDC_STARTCONNTX))
223             {
224                     kvtp->kvt_status &= ~KURLF_STOPRX;
225                     KURLSTATS{kvtp->kvt_txtstart++;kurltxconntxstart++;}
226                     kvt_unlock(kvtp);
227                     kvtp->kvt_remotenet->net_lasttxtime=0; /* force the tx*/
228                     kurlflushnetdata(kvtp->kvt_remotenet|; /* tx rightway */
229                     return;
230             }
231             kvtp->kvt_status |= KURLF_WQNEEDRUN; /* this rarely happens */
232             kurlmaksvtxactive(kvtp}; /* let timer take care of it */
233     }
234     kvt_unlock(kvtp);
235 }
236 /* ===================KURLSRCM CODE ENDS==================================*/
```

What is claimed is:

1. In a client-server system comprising a server computer and at least one client computer, said client computer having user memory space and client memory space, the improvement comprising:

a login process for use in causing a client computer to effect operations by the server computer by passing user key strokes to the server computer, said process comprising the steps of:

providing a stream-head in client kernel memory space between a shell program in client user memory space and a terminal-connection module in client kernel memory space;

creating a target module in client kernel memory space, said target module including code for establishing a network-connection to the server computer;

responding to a client computer request to invoke a log-in session by inserting a source module beneath the stream-head in client kernel memory space, said source module being operative to receive information from the terminal-connection module, to place such information in a selected packet format suitable for transfer by kernel streams facilities, and pass said packets to the target module for transfer by the target module to a stream-head of the server computer for providing login of said client computer on said server computer, passing input received by a client computer terminal device served by the terminal-connection, from the terminal-connection module to the source module and then to the target module; and passing input received by the client computer network-connection to the server computer, from the target module which includes the network-connection and then to the terminal-connection module, wherein during said login process, no other modules are interposed between said terminal-connection module and said source module or between said source module and said target module whereby said log-in process is accomplished on the client side entirely through operation of client kernel memory modules including successive operation of said terminal-connection, source and target modules.

2. The login process of claim 1 wherein said step of inserting the source module in client kernel memory space is performed before said step of creating the target module network-connection in client kernel memory space.

3. The login process of claim 1 wherein the terminal-connection module is a pseudo-terminal-connection.

4. The process of claim 1 wherein said target module further includes code for performing multiplexing and de-multiplexing among connections.

* * * * *